United States Patent
Sundaram et al.

(10) Patent No.: US 12,032,673 B2
(45) Date of Patent: *Jul. 9, 2024

(54) METHOD AND APPARATUS FOR AUTOMATING PROCESS OF RECEIVING VERIFICATION DOCUMENTATION

(71) Applicant: JPMorgan Chase Bank, N.A., New York, NY (US)

(72) Inventors: Kumar K Sundaram, Hockessin, DE (US); Tejokarteek Chintalapati, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,251

(22) Filed: May 11, 2023

(65) Prior Publication Data

US 2023/0281291 A1 Sep. 7, 2023

Related U.S. Application Data

(63) Continuation of application No. 16/931,983, filed on Jul. 17, 2020, now Pat. No. 11,687,640.

(51) Int. Cl.
*G06F 21/36* (2013.01)
*G06F 21/40* (2013.01)
(Continued)

(52) U.S. Cl.
CPC ............. *G06F 21/36* (2013.01); *G06F 21/40* (2013.01); *G06K 19/06028* (2013.01); *G06Q 40/03* (2023.01); *H04N 1/00206* (2013.01)

(58) Field of Classification Search
CPC .... G06F 21/36; G06F 16/9554; G06F 21/606; G06F 21/40
See application file for complete search history.

(56) References Cited

U.S. PATENT DOCUMENTS 7,346,778 B1 *  3/2008  Guiter .............. G06F 21/6245
                                                710/36
10,325,191 B2 *  6/2019  Dixon .............. G07B 17/00508
(Continued)

OTHER PUBLICATIONS

C. M. Li, "AuthPaper: Protecting paper-based documents and credentials using Authenticated 2D barcodes," 2015 IEEE International Conference on Communications (ICC), London, UK, 2015, pp. 7400-7406, doi: 10.1109/ICC.2015.7249509. (Year: 2015).*

*Primary Examiner* — Lizbeth Torres-Diaz
(74) *Attorney, Agent, or Firm* — GREENBLUM & BERNSTEIN, P.L.C.

(57) ABSTRACT

Various methods, apparatuses/systems, and media for automating a process of receiving documentation are provided. A first computing device initiates an electronic communication process to request documentation from a second computing device utilized by a user. A processor receives identification information of the user for generating a unique barcode to be provided with the requested documentation in response to the initiation of the electronic communication. One or more processors generate the unique barcode based on the received identification information of the user; create an application programming interface (API) link for the generated barcode; transmit the electronic communication with the API link attached therein to the second computing device; and automatically obtain the unique barcode upon receiving an input to open the API link from the second computing device, the unique barcode to be attached as a cover sheet with the requested documentation for scanning by a multi-functional device.

20 Claims, 6 Drawing Sheets

(51) Int. Cl.
    *G06K 19/06*     (2006.01)
    *G06Q 40/03*     (2023.01)
    *H04N 1/00*     (2006.01)

(56) References Cited

U.S. PATENT DOCUMENTS

| | | | |
|---|---|---|---|
| 11,087,101 B2* | 8/2021 | Hale | G06K 19/07767 |
| 11,593,580 B1* | 2/2023 | Harper | G06K 7/1417 |
| 2001/0029513 A1* | 10/2001 | Kuwano | H04N 1/00413 |
| | | | 715/252 |
| 2012/0185317 A1* | 7/2012 | Wong | G06Q 30/00 |
| | | | 705/14.23 |
| 2014/0299662 A1* | 10/2014 | Harrison | B23K 26/20 |
| | | | 235/375 |
| 2015/0008256 A1* | 1/2015 | Beadles | G06K 19/06037 |
| | | | 235/494 |
| 2016/0072626 A1* | 3/2016 | Kouladjie | G06F 21/44 |
| | | | 713/189 |
| 2020/0293384 A1* | 9/2020 | Park | G06F 16/93 |
| 2022/0019651 A1* | 1/2022 | Sundaram | H04N 1/00206 |
| 2022/0138306 A1* | 5/2022 | Marinescu | G06F 21/602 |
| | | | 726/26 |

* cited by examiner

METHOD AND APPARATUS FOR AUTOMATING PROCESS OF RECEIVING VERIFICATION DOCUMENTATION

CROSS-REFERENCE TO RELATED APPLICATIONS

This application is a Continuation of U.S. patent application Ser. No. 16/931,983, filed on Jul. 17, 2020, the entire disclosure of which is expressly incorporated by reference herein.

TECHNICAL FIELD

This disclosure generally relates to data processing, and, more particularly, to methods and apparatuses for implementing a verification documentation receiving module for automating the process of receiving additional verification documentation from an applicant at retail branches or via uploads.

BACKGROUND

Currently, when additional documentation is required from an applicant (e.g., an applicant applying for a bank card, credit card, retail store card, loan, etc.), a process to create and mail a physical letter may be initiated. This letter may request that the necessary information be provided by the applicant and the documentation is often returned only by mail or fax. As part of a business initiative, a platform may be provided so that a firm may request, and the applicant may provide, necessary additional verification documentation digitally by uploading the requested documents. However, if the applicant prefers to deliver the requested documents at a nearby retail branch, there is currently no automated process to receive and process the documents and notify the concern personnel for expediting decision making process.

SUMMARY

The present disclosure, through one or more of its various aspects, embodiments, and/or specific features or sub-components, may provide, among others, various systems, servers, devices, methods, media, programs, and platforms for implementing a verification documentation receiving module for automating the process of receiving additional verification documentation from an applicant at retail branches, but the disclosure is not limited thereto.

According to an aspect of the present disclosure, a method for automating a process of receiving documentation by utilizing one or more processors and one or more memories is disclosed. The method may include: initiating, by a first computing device utilized by a first user, an electronic communication process to request documentation from a second computing device utilized by a second user; receiving identification information of the second user for generating a unique barcode to be provided with the requested documentation in response to the initiating of the electronic communication; generating the unique barcode based on the received identification information of the second user; creating an application programming interface (API) link for the generated barcode; transmitting the electronic communication with the API link attached therein to the second computing device; and automatically obtaining the unique barcode upon receiving an input to open the API link from the second computing device, the unique barcode to be attached as a cover sheet with the requested documentation for scanning by a multi-functional device.

According to another aspect of the present disclosure, wherein the unique barcode is a one-time use barcode such that transmitting verification documentation by the multi-functional device with an already used barcode would be rejected by an archive system.

According to yet another aspect of the present disclosure, wherein the electronic communication process is an electronic mail (e-mail) communication process, but the disclosure is not limited thereto.

According to further aspect of the present disclosure, the method may further include: scanning, by the multi-functional device, the cover sheet having the unique barcode along with the requested documentation; decoding, by the multi-functional device, the unique barcode; and triggering, based on decoding the unique barcode, an automated process of transmitting the requested documentation to an archive system.

According to an additional aspect of the present disclosure, wherein, when the requested documentation is archived in the archive system, the method may further include: sending an automatic electronic acknowledgement notification to a personnel's computing device operatively connected to the multi-functional device; and sending an automatic electronic notification to the first computing device and the second computing device that the requested documentation has been successfully archived in the archive system.

According to another aspect of the present disclosure, wherein the automatic electronic notification includes one or more of the following: e-mail, SMS (Short Message Service), and push notification, but the disclosure is not limited thereto.

According to yet another aspect of the present disclosure, wherein the automatically obtaining the unique barcode may further include: automatically sending an inquiry, by an e-mail client device associated with an e-mail account of the second user to a barcode management micro service device via an API gateway based on receiving the input to open the API link from the second computing device, to confirm that the API link is sent to the second user who is an authorized user; verifying that the second user is an authorized user who should receive the unique barcode based on matching the identification information of the second user with the associated e-mail account of the second user; and sending the unique barcode to the e-mail account of the second user for further processing.

According to an additional aspect of the present disclosure, a system for automating a process of receiving documentation is disclosed. The system may include one or more memories and one or more processors operatively connected to the one or more memories via a communication network. The one or more processors may be configured to: initiate, by a first computing device utilized by a first user, an electronic communication process to request documentation from a second computing device utilized by a second user; receive identification information of the second user for generating a unique barcode to be provided with the requested documentation in response to the initiating of the electronic communication; generate the unique barcode based on the received identification information of the second user, create an application programming interface (API) link for the generated barcode; transmit the electronic communication with the API link attached therein to the second computing device; and automatically obtain the unique barcode upon receiving an input to open the API link from the second computing device, the unique barcode to be attached as a cover sheet with the requested documentation for scanning by a multi-functional device.

According to another aspect of the present disclosure, the one or more processors may be further configured to: scan, by the multi-functional device, the cover sheet having the unique barcode along with the requested documentation; decode, by the multi-functional device, the unique barcode; and trigger, based on decoding the unique barcode, an automated process of transmitting the requested documentation to an archive system.

According to yet another aspect of the present disclosure, wherein, when the requested documentation is archived in the archive system, the one or more processors may be further configured to: send an automatic electronic acknowledgement notification to a personnel's computing device operatively connected to the multi-functional device; and send an automatic electronic notification to the first computing device and the second computing device that the requested documentation has been successfully archived in the archive system.

According to a further aspect of present disclosure, wherein for automatically obtaining the unique barcode, the one or more processors may be further configured to: automatically send an inquiry, by an e-mail client device associated with an e-mail account of the second user to a barcode management micro service device via an API gateway based on receiving the input to open the API link from the second computing device, to confirm that the API link is sent to the second user who is an authorized user; verify that the second user is an authorized user who should receive the unique barcode based on matching the identification information of the second user with the associated e-mail account of the second user; and send the unique barcode to the e-mail account of the second user for further processing.

According to an additional aspect of the present disclosure, a non-transitory computer readable medium configured to store instructions for automating a process of receiving documentation is disclosed. The instructions, when executed, may cause one or more processors to perform the following: initiating, by a first computing device utilized by a first user, an electronic communication process to request documentation from a second computing device utilized by a second user; receiving identification information of the second user for generating a unique barcode to be provided with the requested documentation in response to the initiating of the electronic communication; generating the unique barcode based on the received identification information of the second user; creating an application programming interface (API) link for the generated barcode; transmitting the electronic communication with the API link attached therein to the second computing device; and automatically obtaining the unique barcode upon receiving an input to open the API link from the second computing device, the unique barcode to be attached as a cover sheet with the requested documentation for scanning by a multi-functional device.

According to a further aspect of the present disclosure, wherein when executed, the instructions may cause the one or more processors to further perform the following: scanning, by the multi-functional device, the cover sheet having the unique barcode along with the requested documentation; decoding, by the multi-functional device, the unique barcode; and triggering, based on decoding the unique barcode, an automated process of transmitting the requested documentation to an archive system.

According to yet another aspect of the present disclosure, wherein, when the requested documentation is archived in the archive system, the instructions, when executed, may cause the one or more processors to further perform the following: sending an automatic electronic acknowledgement notification to a personnel's computing device operatively connected to the multi-functional device; and sending an automatic electronic notification to the first computing device and the second computing device that the requested documentation has been successfully archived in the archive system.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

Figure 1:
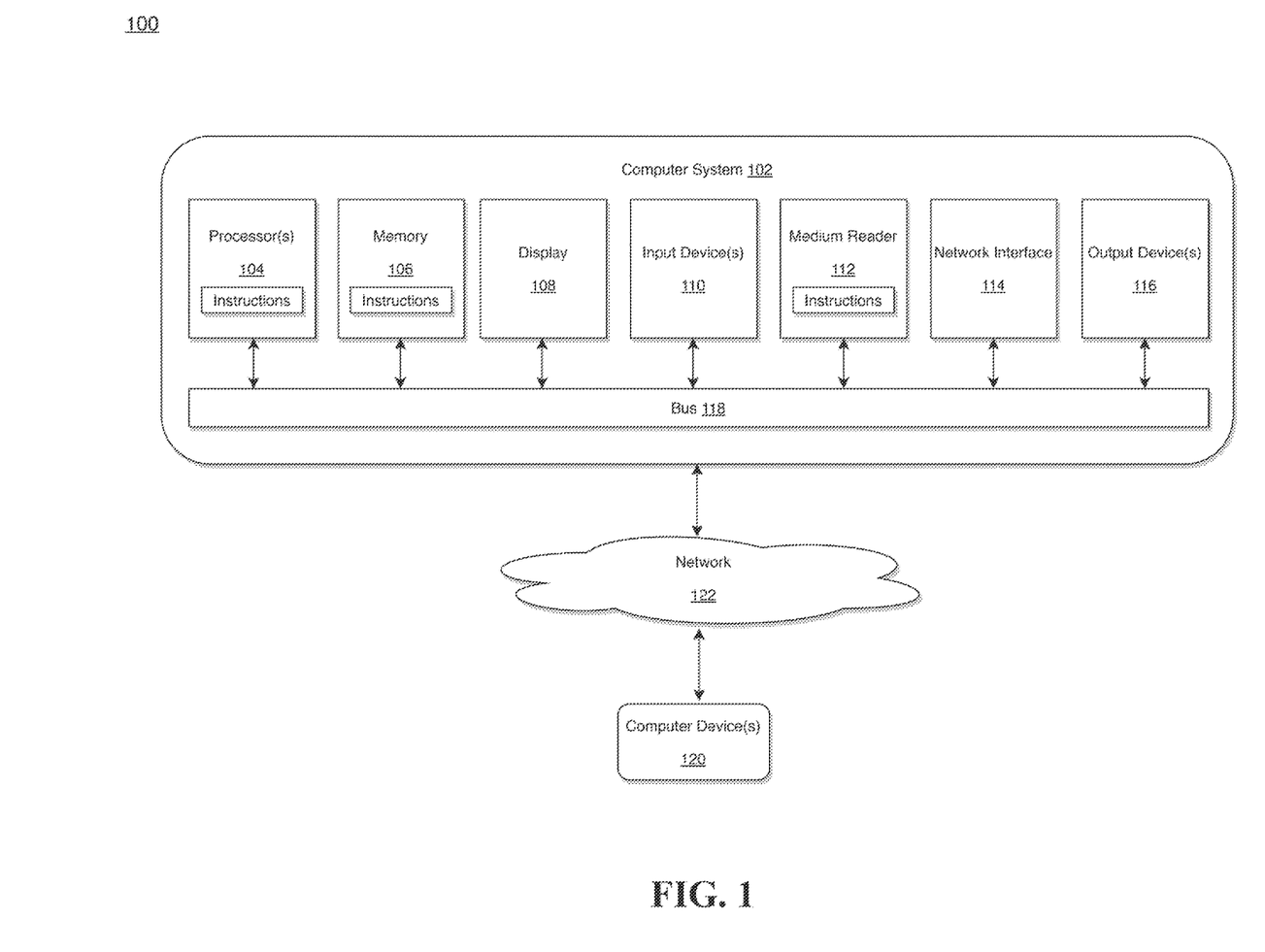
FIG. 1 illustrates a computer system for implementing a verification documentation receiving device in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes of implementing a verification documentation receiving module for automating the process of receiving additional verification documentation from an applicant at retail branches, but the disclosure is not limited thereto.

Figure 2:
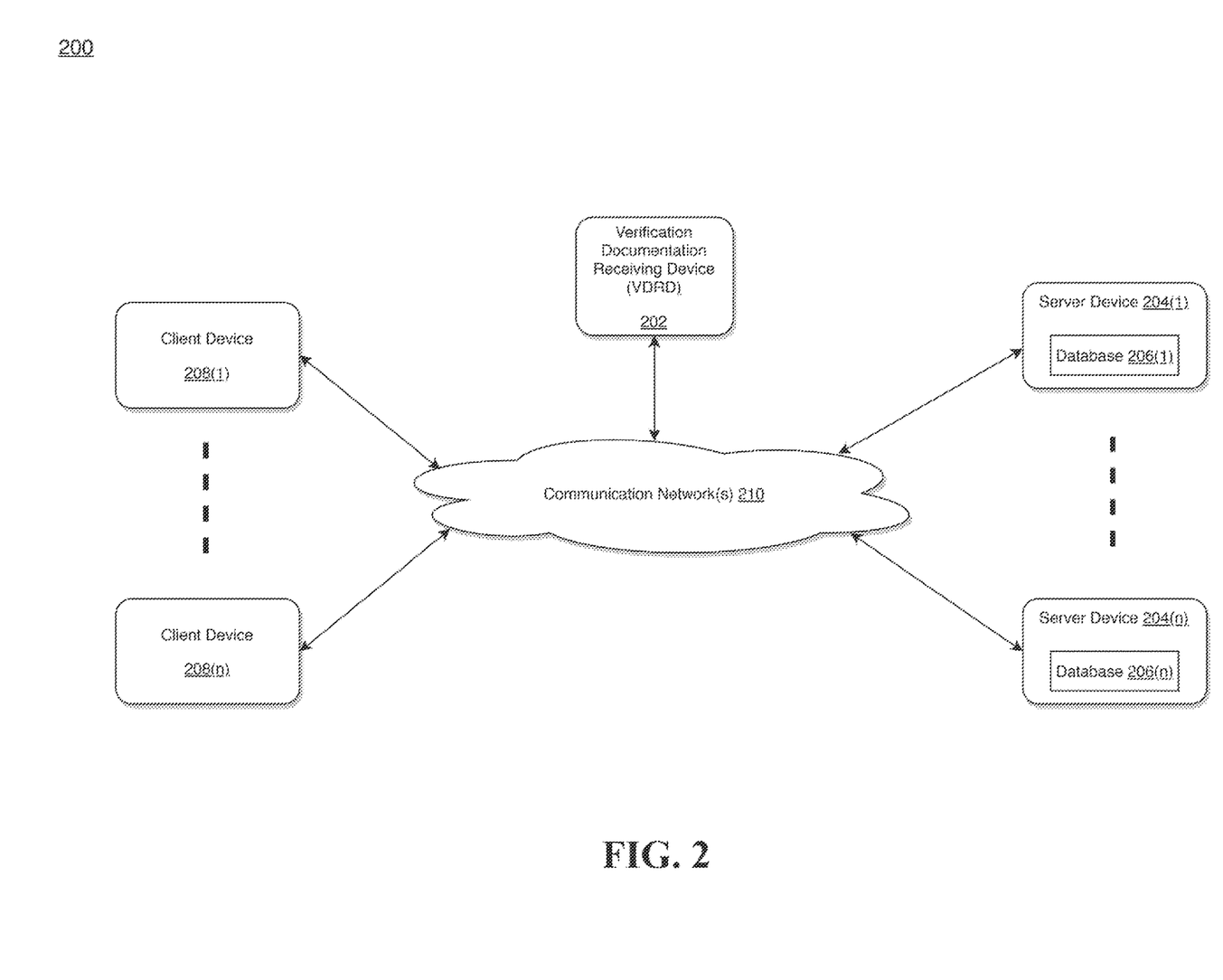
FIG. 2 illustrates an exemplary diagram of a network environment with a verification documentation receiving device in accordance with an exemplary embodiment.

Referring to FIG. 2, a schematic of an exemplary network environment 200 for implementing a verification documentation receiving device (VDRD) of the instant disclosure is illustrated.

According to exemplary embodiments, the above-described problems associated with conventional system may be overcome by implementing a VDRD 202 having a verification documentation receiving module as illustrated in FIG. 2 by for automating the process of receiving additional verification documentation from an applicant at retail branches, but the disclosure is not limited thereto.

The VDRD 202 may be the same or similar to the computer system 102 as described with respect to FIG. 1.

The VDRD 202 may store one or more applications that can include executable instructions that, when executed by the VDRD 202, cause the VDRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud based computing environment. Also, the application(s), and even the VDRD 202 itself, may be located in virtual server(s) running in a cloud-based computing environment rather than being tied to one or more specific physical network computing devices. Also, the application(s) may be running in one or more virtual machines (VMs) executing on the VDRD 202. Additionally, in one or more embodiments of this technology, virtual machine(s) running on the VDRD 202 may be managed or supervised by a hypervisor.

In the network environment 200 of FIG. 2, the VDRD 202 is coupled to a plurality of server devices 204(1)-204(n) that hosts a plurality of databases 206(1)-206(n), and also to a plurality of client devices 208(1)-208(n) via communication network(s) 210. A communication interface of the VDRD 202, such as the network interface 114 of the computer system 102 of FIG. 1, operatively couples and communicates between the VDRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VDRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VDRD 202 may be a standalone device or integrated with one or more other devices or apparatuses, such as one or more of the server devices 204(1)-204(n), for example. In one particular example, the VDRD 202 may be hosted by one of the server devices 204(1)-204(n), and other arrangements are also possible. Moreover, one or more of the devices of the VDRD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VDRD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the VDRD 202 that may be configured for automating the process of receiving additional verification documentation from an applicant at retail branches, but the disclosure is not limited thereto.

The client devices 208(1)-208(n) may run interface applications, such as standard web browsers or standalone client applications, which may provide an interface to communicate with the VDRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the VDRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VDRD 202, the server devices 204(1)-204(n), or the client devices 208(1)-208(n), for example, may be configured to operate as virtual instances on the same physical machine. For example, one or more of the VDRD 202, the server devices 204(1)-204(n), or the client devices 208(1)-208(n) may operate on the same physical device rather than as separate devices communicating through communication network(s) 210. Additionally, there may be more or fewer VDRDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
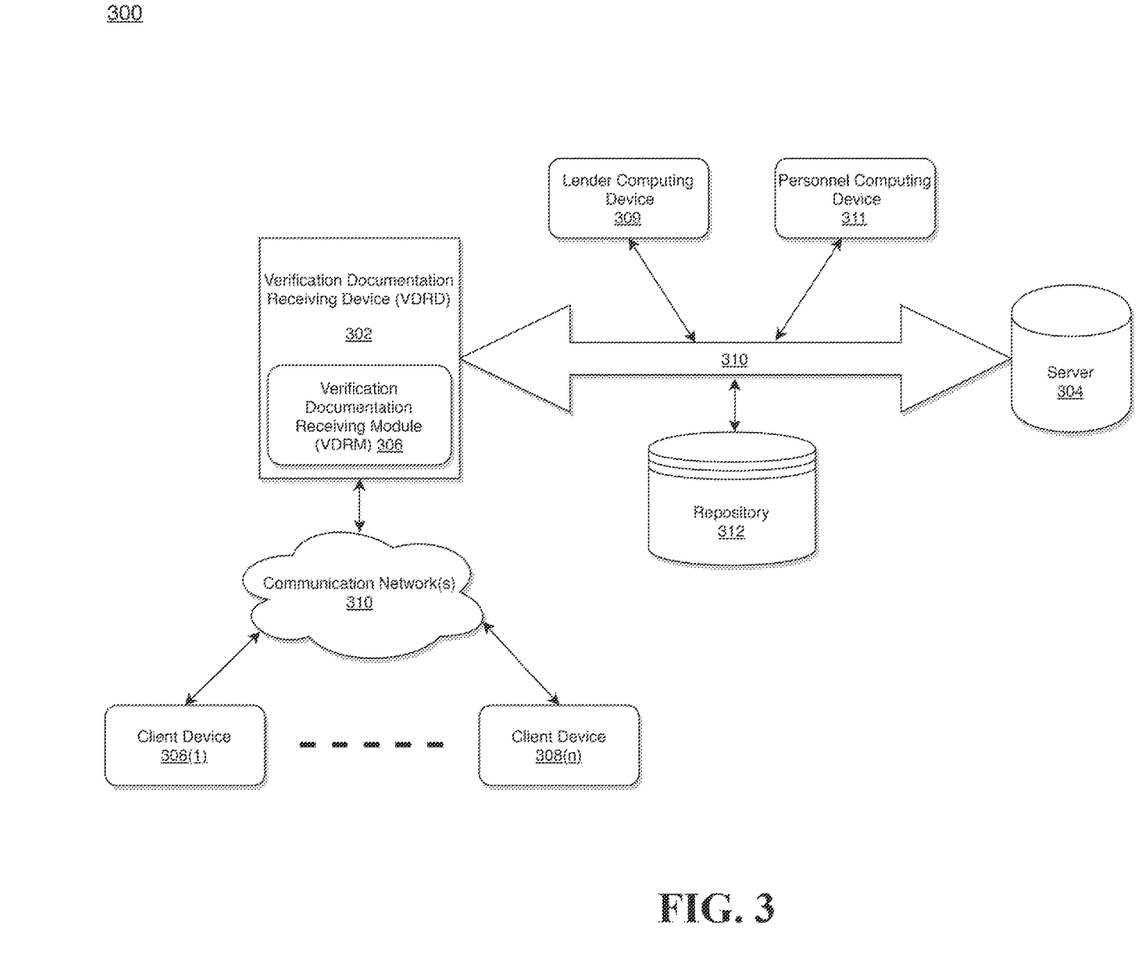
FIG. 3 illustrates a system diagram for implementing a verification documentation receiving device with a verification documentation receiving module in accordance with an exemplary embodiment.

FIG. 3 illustrates a system diagram for implementing a verification documentation receiving device (VDRD) with a verification documentation receiving module (VDRM) in accordance with an exemplary embodiment.

As illustrated in FIG. 3, the VDRD 302 including the VDRM 306 may be connected to a server 304, and repository 312 via a communication network 310. The VDRD 302 may also be connected to a plurality of client devices 308(1)-308(n), lender computing device 309, and a personnel computing device 311 via the communication network 310, but the disclosure is not limited thereto.

The terms "client device," "lender computing device" or "personnel computing device" are not limiting as they can be simply referred to as "computing device." According to this exemplary embodiment, the client devices 308(1)-308(n) may be utilized by one or more applicants who apply for a loan from one or more lenders, or who apply for a credit card, bank card, retail store card, etc. from corresponding vendors or card issuers. Thus, the "lender computing device 309" may be utilized by the lender or the vendors or the card issuers who would request additional verification documentations for processing and/or approving the loan, or the requested credit card, bank card, or the retail store card, but the disclosure is not limited thereto. According to exemplary embodiments, the personnel computing device 311 may be utilized by an assisting personnel of a retail branch associated with the lenders, vendors, or card issuers who would assist the applicants for automatically processing the requested additional verification documentations and automatically transmitting to the appropriate lender or the vendor or the card issuer. In this exemplary embodiment, the lender may be referred to as a "first user," the applicant may be referred to as "a second user," and the assisting personnel may be referred to as a "third user," but the disclosure is not limited thereto.

According to exemplary embodiment, the VDRD 302 is described and shown in FIG. 3 as including the VDRM 306, although it may include other rules, policies, modules, databases, or applications, for example. According to exemplary embodiments, the repository 312 may be embedded within the VDRD 302. According to exemplary embodiments, the repository 312 may be configured to store information including: rules, programs, framework templates, etc., but the disclosure is not limited thereto.

According to exemplary embodiments, the VDRM 306 may be configured to receive continuous feed of data from the repository 312 via the communication network 310. According to exemplary embodiments, the repository 312 may be a file archiving system.

As will be described below, the VDRM 306, having one or more processors embedded therein, may be configured to initiate, by a first computing device utilized by a first user, an electronic communication process to request documentation from a second computing device utilized by a second user; receive identification information of the second user for generating a unique barcode to be provided with the requested documentation in response to the initiating of the electronic communication; generate the unique barcode based on the received identification information of the second user; create an application programming interface (API) link for the generated barcode; transmit the electronic communication with the API link attached therein to the second computing device; and automatically obtain the unique barcode upon receiving an input to open the API link from the second computing device, the unique barcode to be attached as a cover sheet with the requested documentation for scanning by a multi-functional device (e.g., a scanner operatively connected with various systems via cloud-based network environment), but the disclosure is not limited thereto.

The plurality of client devices 308(1)-308(n) are illustrated as being in communication with the VDRD 302. In this regard, the plurality of client devices 308(1)-308(n) may be "clients" of the VDRD 302 and are described herein as such. Nevertheless, it is to be known and understood that the plurality of client devices 308(1)-308(n) need not necessarily be "clients" of the VDRD 302, or any entity described in association therewith herein. Any additional or alternative relationship may exist between either or more of the plurality of client devices 308(1)-308(n) and the VDRD 302, or no relationship may exist.

The plurality of client devices 308(1)-308(n) may be, for example, a smart phone, or a tablet, or a personal computer, but the disclosure is not limited thereto. Of course, the plurality of client devices 308(1)-308(n) may be any additional device described herein. The lender computing device 309 and the personnel computing device 311 may be, for example, a smart phone, or a tablet, or a personal computer, but the disclosure is not limited thereto. Of course, the lender computing device 309 and the personnel computing device 311 may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n), the lender computing device 309, and the personnel computing device 311 may communicate with the VDRD 302 via broadband or cellular communication or cloud-based network communication. Of course, these embodiments are merely exemplary and are not limiting or exhaustive.

Figure 4:
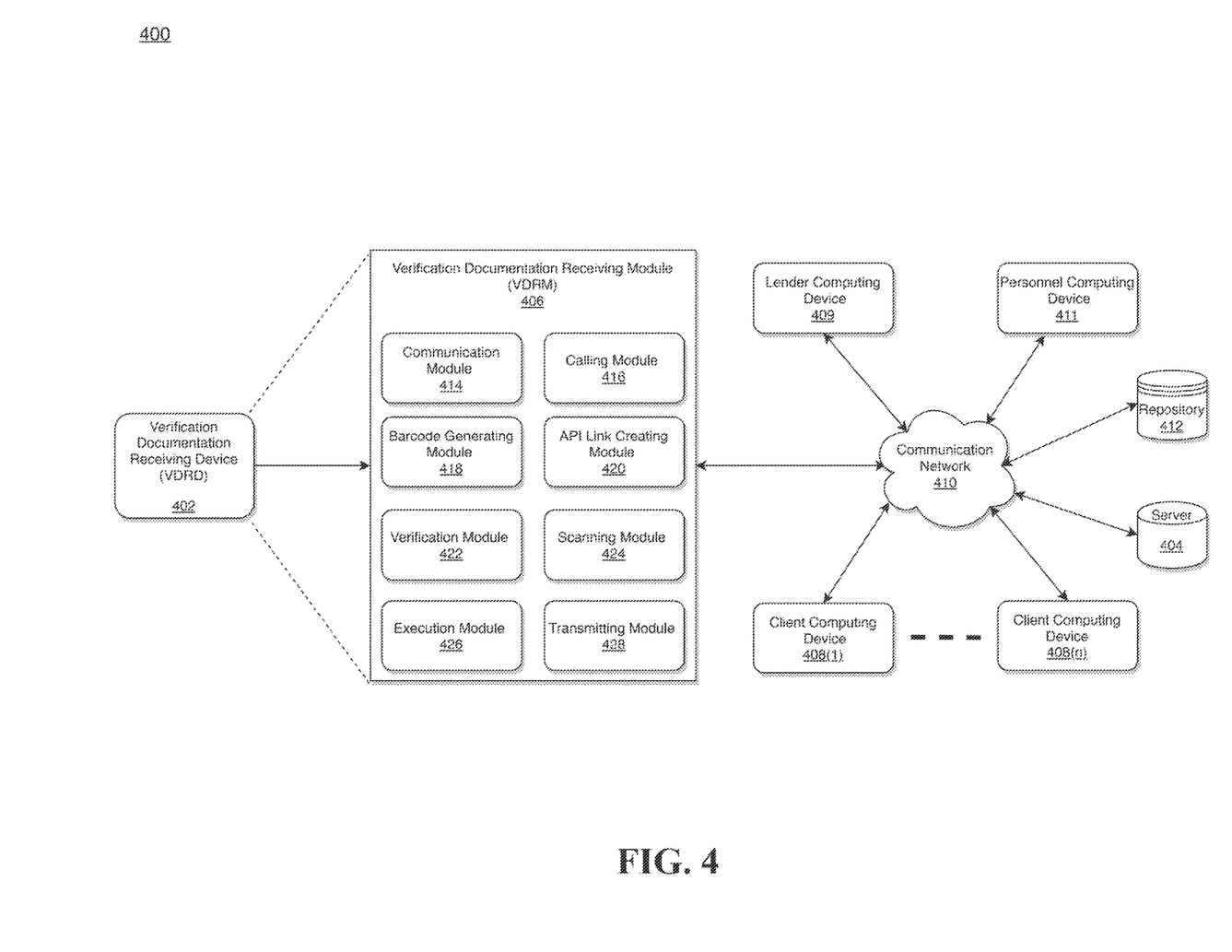
FIG. 4 illustrates a system diagram for implementing a verification documentation receiving module of FIG. 3 in accordance with an exemplary embodiment.

FIG. 4 illustrates a system diagram for implementing a verification documentation receiving module of FIG. 3 in accordance with an exemplary embodiment. As illustrated in FIG. 4, the system 400 may include a verification documentation receiving device (VDRD) 402 within which a data integration framework module (VDRM) 406 may be embedded, repository 412, a server 404, client computing devices 408(1)-408(n), a lender computing device 409, a personnel computing device 411, and a communication network 410. According to exemplary embodiments, the VDRD 402, VDRM 406, repository 412, the server 404, the client devices 408(1)-408(0), the lender computing device 409, the personnel computing device 411, and the communication network 410 as illustrated in FIG. 4 may be the same or similar to the VDRD 302, VDRM 306, repository 312, the server 304, the client devices 308(1)-308(n), the lender computing device 309, the personnel computing device 311, and the communication network 310, respectively, as illustrated in FIG. 3.

As illustrated in FIG. 4, the VDRM 406 may include a communication module 414, a calling module 416, a barcode generating module 418, an API (application programming interface) link creating module 420, a verification module 422, a scanning module 424, an execution module 426, and a transmitting module 428. According to exemplary embodiments, the repository 412 may be external to the VDRD 402 may include various systems that are managed and operated by an archive system. Alternatively, according to exemplary embodiments, the repository 412 may be embedded within the VDRD 402 and/or the VDRM The process may be executed via the communication network 410, which may comprise plural networks as described above. For example, in an exemplary embodiment, the various components of the VDRM 406 may communicate with the server 404, the repository 412, the client computing devices 408(1)-408(n), the lender computing device 409, and the personnel computing device 411 via the communication network 410 and communication module 414. Of course, these embodiments are merely exemplary and are not limiting or exhaustive.

According to exemplary embodiments, the communication network 410 and the communication module 414 may be configured to establish a link between the repository 412, client computing devices 408(1)-408(n), the lender computing device 409, the personnel computing device 411, and the VDRM 406.

According to exemplary embodiments, each of the communication module 414, a calling module 416, barcode generating module 418, API link creating module 420, a verification module 422, scanning module 424, execution module 426, and the transmitting module 428 may be implemented by microprocessors or similar, they may be programmed using software (e.g., microcode) to perform various functions discussed herein and may optionally be driven by firmware and/or software. Alternatively, each of the communication module 414, a calling module 416, barcode generating module 418, API link creating module 420, a verification module 422, scanning module 424, execution module 426, and the transmitting module 428 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, a calling module 416, barcode generating module 418, API link creating module 420, a verification module 422, scanning module 424, execution module 426, and the transmitting module 428 may be physically separated into two or more interacting and discrete blocks, units, devices, and/or modules without departing from the scope of the inventive concepts.

Figure 5:
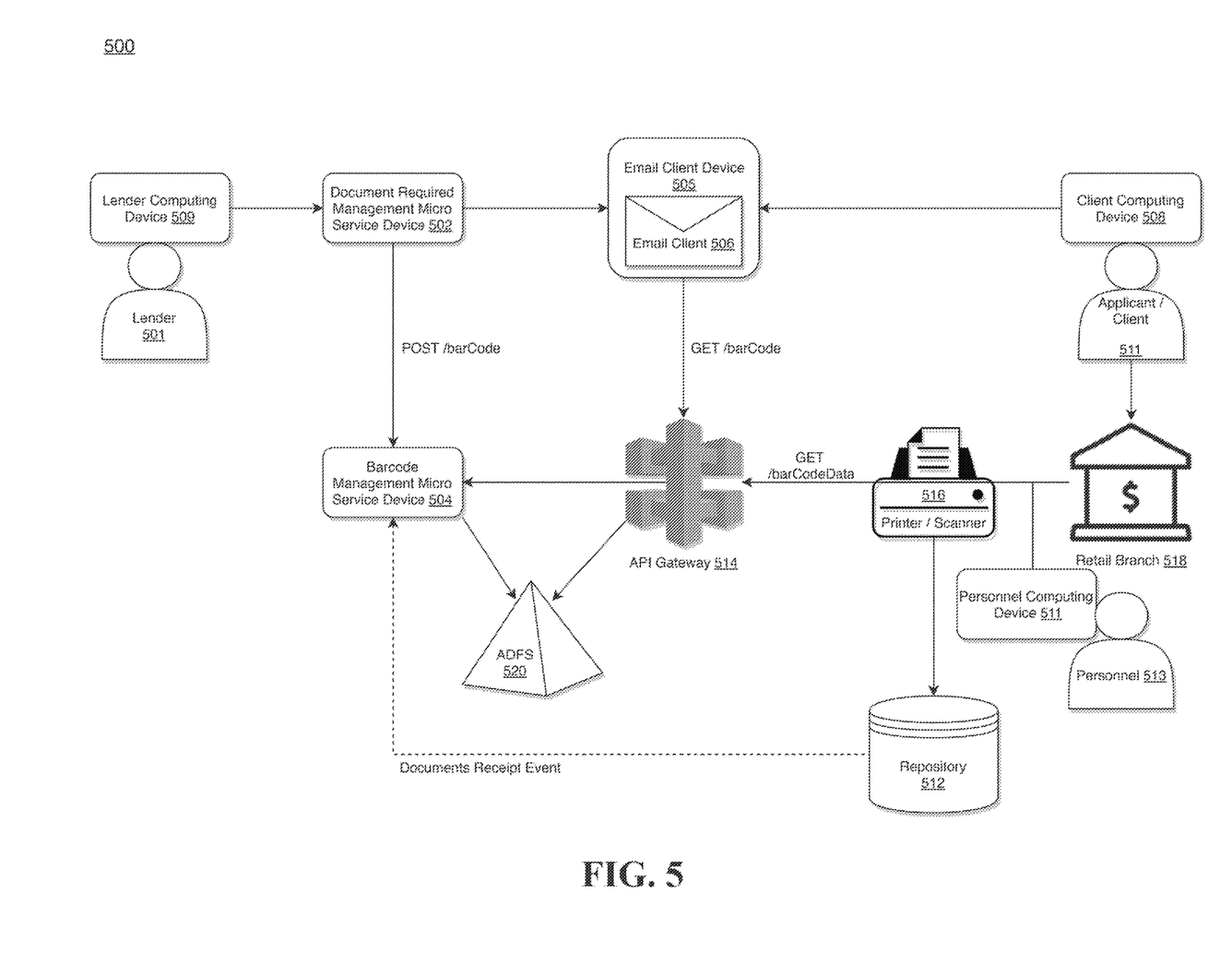
FIG. 5 illustrates a system diagram of an exemplary use case of receiving a verification documentation in accordance with an exemplary embodiment.

According to exemplary embodiments, FIG. 5 illustrates a system diagram of an exemplary use case of receiving a verification documentation by utilizing one or more of the above-described modules of the VDRM 406 in accordance with an exemplary embodiment.

As illustrated in FIG. 5, the system 500 illustrates a lender computing device 509 utilized by a lender 501 operatively connected with a document required management micro service device 502 which is operatively connected with both of a barcode management micro service device 504 and an email client device 505. The barcode management micro service device 504 may also be operatively connected with the email client device 505 via an API gateway 514. The email client device 505 may be operatively connected with a client computing device 508 utilized by an applicant/client 511. The personnel computing device 511 utilized by a personnel 513 at a retail branch 518 may be operatively connected with a printer/scanner 516. According to exemplary embodiments, the personnel 513 may directly operate the printer/scanner 516 without needing the personnel computing device 511. According to exemplary embodiments, the printer/scanner 516 may also be referred to as a multi-functional device.

According to exemplary embodiments, the printer/scanner 516 may be operatively connected with a repository 512 and the API gateway 514. Both the API gateway 514 and the barcode management micro service device 504 may be operatively connected with an ADFS 520 which is a software component running on operating systems to provide users with single sign-on access to systems and applications located across organizational boundaries. The ADFS 520 may also be associated with an API management tool providing application developers with a free, cloud-based platform for providing security and analytics for their APIs.

According to exemplary embodiments, the repository 512 may be operatively connected with the barcode management micro service device 504.

According to exemplary embodiments, the client computing device 508, the lender computing device 509, the personnel computing device 511, and the repository 512 as illustrated in FIG. 5 may be the same or similar to the client devices 308(1)-308(n), the lender computing device 309, the personnel computing device 311, and the repository 312, respectively, as illustrated in FIG. 3.

Thus, according to this exemplary embodiment, the client computing device 408, 508 may be utilized by the applicant 511 who may apply for a loan from one or more lenders 501, or who apply for a credit card, bank card, retail store card, etc. from corresponding vendors or card issuers. The lender computing device 409, 509 may be utilized by the lender 501 or the vendors or the card issuers who would request additional verification documentations for processing and/or approving the loan, or the requested credit card, bank card, or the retail store card, but the disclosure is not limited thereto. According to exemplary embodiments, the personnel computing device 411, 511 may be utilized by the personnel 513 of a retail branch associated with the lenders, vendors, or card issuers who would assist the applicant 511 for automatically processing the requested additional verification documentations and automatically transmitting to the appropriate lender 501 or the vendor or the card issuer. In this exemplary embodiment, the lender 501 may be referred to as a "first user," the applicant 511 may be referred to as "a second user," and the assisting personnel 513 may be referred to as a "third user," but the disclosure is not limited thereto.

According to exemplary embodiments, the document required management micro service device 502 may be associated with a document required management micro service and the barcode management micro service device 504 may be associated with a barcode management micro service. The document required management micro service and the barcode management micro service may be supported by a cloud-based network environment powered by GAIA, an open source platform for building pipelines in any programming language. For example, an open source container management system, such as Kubernetes may be utilized within this cloud-based network environment for deploying the document required management micro service and the barcode management micro service.

According to exemplary embodiments physical security as a service (PSAAS) may be implemented for cloud computing solution for securely transmitting barcode image.

Referring to FIGS. 4-5, according to exemplary embodiments, the communication module 414 may be configured to initiate, by the lender computing device 409, 509 utilized by the lender 501, an electronic communication process to request additional verification documentations from the client computing device 408, 508 utilized by an applicant 511.

According to exemplary embodiments, the calling module 416 may be configured to call, by the document required management micro service device 502 to the barcode management micro service device 504, for posting a unique barcode. The document required management micro service device 502 may send information (i.e., identification information, account information, loan information, etc., but the disclosure is not limited thereto) of the applicant 511 for generating the unique barcode to be provided with the requested documentations in response to the initiating of the electronic communication.

According to exemplary embodiments, the barcode generating module 418 may be configured to allow the barcode management micro service device 504 to generating the unique barcode based on the received identification information of the applicant 511.

According to exemplary embodiments, the API link creating module 420 may be configured to allow the barcode management micro service device 504 to create an API link for the generated barcode.

According to exemplary embodiments, the transmitting module 428 may be configured to allow the document required management micro service device 502 to transmit the electronic communication with the API link attached therein to the client computing device 408, 508 via the email client device 505 managed and controlled by email client 506 of the applicant's 511 choice. According to exemplary embodiments, the email client 506 may be Gmail, Yahoo, Hotmail, Outlook, etc., but the disclosure is not limited thereto.

According to exemplary embodiments, the email client 506 may automatically obtain the unique barcode upon receiving an input to open the API link from the client computing device 408, 508. The unique barcode to be attached as a cover sheet with the requested documentations for scanning by the printer/scanner 516.

According to exemplary embodiments, the unique barcode may be a one-time use barcode such that transmitting requested verification documentations by the printer/scanner 516 with an already used barcode would be rejected by an archive system (e.g., the repository 412, 512).

According to exemplary embodiments, the electronic communication process is an electronic mail (e-mail) communication process, but the disclosure is not limited thereto.

According to exemplary embodiments, the scanning module 424 may be configured to allow the printer/scanner 516 to scan the cover sheet having the unique barcode along with the requested documentations provided by the applicant 511; decode the unique barcode; and trigger, based on decoding the unique barcode, an automated process of transmitting the requested documentations to the archive system (e.g., the repository 412, 512).

According to exemplary embodiments, when the requested documentation is archived in the archive system (e.g., the repository 412, 512), the communication module 414 and the transmitting module 428 may be configured to allow the archive system (e.g., the repository 412, 512) to send an automatic electronic acknowledgement notification to the personnel computing device 411, 511 operatively connected to the printer/scanner 511; and send an automatic electronic notification to the client computing device 408, 508 and the lender computing device 409, 509 that the requested documentations has been successfully archived in the archive system (e.g., the repository 412, 512).

According to exemplary embodiments, the automatic electronic notification may include one or more of the following: e-mail, SMS (Short Message Service), and push notification, but the disclosure is not limited thereto.

According to exemplary embodiments, wherein the automatically obtaining the unique barcode by the email client 506 may further include: automatically sending an inquiry, by the e-mail client device 506 associated with an e-mail account of the applicant 511 to the barcode management micro service device 504 via the API gateway 514 based on receiving the input to open the API link from the client computing device 408, 508, to confirm that the API link is sent to the applicant 511 who is an authorized user. The verification module 422 may be configured to allow the barcode management micro service device 504 to verify that the applicant 511 is an authorized user who should receive the unique barcode based on matching the identification information of the applicant 511 with the associated e-mail account of the applicant 511. The communication module 414 and the transmitting module 428 may be configured to allow the barcode management micro service device 504 to send the unique barcode to the e-mail account of the applicant 511 for further processing.

That is, after sending over by the applicant 511 the requested documents with the unique barcode to the retail branch 518, or after uploading the requested documentations with the attached unique barcode sheet, when another user or the applicant 511 opens the same email again that included the API link, the email client 506 may again automatically send an inquiry to the barcode management micro service device 504 via the API gateway 514, and may learn that the unique barcode has already been utilized and it is no longer available because the transaction associated with the barcode has been closed. Thus, the barcode management micro service device 504 may not return back the same unique barcode to the applicant 511 via the email client 506. This will prevent from using the same unique barcode by an unauthorized user or by the same applicant 511 who already completed the transaction using the unique barcode.

According to exemplary embodiments, the VDRM 406, by utilizing barcode management micro service device 504, may be configured to expose a first unauthenticated API that may be used to render the unique barcode when applicants 511 invoke the API link through the email client 506 of their choice. The VDRM 406, by utilizing barcode management micro service device 504, may also be configured to serve as a utility service that can potentially maintain business rules and required security measures to ensure data confidentiality and protect an organization by not exposing any details.

According to exemplary embodiments, the barcode management service may be leveraged to render a unique bar-code as part of credit card application submission process that the applicants 511 can make use of by scanning the unique barcode through their personal devices (mobile phones, tablets, etc., but the disclosure is not limited thereto) and start the transaction of providing the requested documentations from their personal devices (mobile phones, tablets, etc., but the disclosure is not limited thereto).

Referring to FIGS. 4-5 again, the VDRM 406 may be configured to implement the following processes to expose the API while addressing security concerns. For example, according the exemplary embodiments, the barcode management micro service device 504 may be configured to call, by utilizing the calling module 416, the sign_and_encrypt API on the API gateway 514 by passing the client ID (clientID) associated with the applicant 511 to retrieve a time-based digital signature token. The barcode management micro service device 504 may also be configured to append the reference number and document request identifier, encrypt the resultant string using a managed encryption framework and construct a URL using the digital signature token and the encrypted string. The VDRM 406 may be configured to pass this URL in the email for sending the URL to the applicant 511 through email alerts via email client 506.

According to exemplary embodiments, an API call may happen in the background when applicant 511 opens the email. The decrypt_and_verify API on the API gateway 514 may get invoked in response to the API call, which may be configured to decrypt and validate the client ID and the time-based digital signature token. According to exemplary embodiments, the API gateway 514 may also be configured to enforce spike arrest policy to handle denial of service. The keys used on the API gateway 514 for signing and verifying the time-based digital signature token may be specific to this use case. According to exemplary embodiments, keys can be rotated based on firm-wide policies.

According to exemplary embodiments, the request may then be sent to the barcode management micro service device 504, which may be configured to perform additional validations and may return the barcode image (byte array), which may be get rendered on a display screen of the client computing device 508.

According to exemplary embodiments, when the applicant 511 brings the requested documents and the barcode to the retail branch 518, the personnel 513 may scan the documents and the barcode using the printer/scanner 516. Upon successful scan, the printer/scanner 516 may be configured to automatically make a call to the barcode management service device 504 to retrieve the reference number.

According to exemplary embodiments, the barcode management service device 504 may be configured to decrypt and validate the request before providing the reference number. The barcode management service device 504 may also be configured to keep track of the document submission status and decline barcode generation if the documents are already submitted through any of the channels described herein.

According to exemplary embodiments, a non-transitory computer readable medium may be configured to store instructions for automating a process of receiving requested additional verification documentations. According to exemplary embodiments, the instructions, when executed, may cause one or more processors embedded within the VDRM 406 or the VDRD 402 to perform the following: initiating, by a first computing device utilized by a first user, an electronic communication process to request documentation from a second computing device utilized by a second user; receiving identification information of the second user for generating a unique barcode to be provided with the requested documentation in response to the initiating of the electronic communication; generating the unique barcode based on the received identification information of the second user; creating an application programming interface (API) link for the generated barcode; transmitting the electronic communication with the API link attached therein to the second computing device; and automatically obtaining the unique barcode upon receiving an input to open the API link from the second computing device, the unique barcode to be attached as a cover sheet with the requested documentation for scanning by a multi-functional device. The processor may be the same or similar to the processor 104 as illustrated in FIG. 1 or the processor embedded within VDRD 202, VDRD 302, VDRM 306, VDRD 402, and VDRM 406. In addition, the one or more processors may also be embedded within each computing device as disclosed above.

According to exemplary embodiments, the instructions, when executed, may further cause the one or more processors 104 to perform the following: implementing code data transformation services as part of the data processing framework.

According to exemplary embodiments, the instructions, when executed, may further cause the processor 104 to perform the following: scanning, by the multi-functional device, the cover sheet having the unique barcode along with the requested documentation; decoding, by the multi-functional device, the unique barcode; and triggering, based on decoding the unique barcode, an automated process of transmitting the requested documentation to an archive system.

According to exemplary embodiments, wherein, when the requested documentation is archived in the archive system, the instructions, when executed, may cause the one or more processors 104 to further perform the following: sending an automatic electronic acknowledgement notification to a personnel's computing device operatively connected to the multi-functional device; and sending an automatic electronic notification to the first computing device and the second computing device that the requested documentation has been successfully archived in the archive system.

Figure 6:
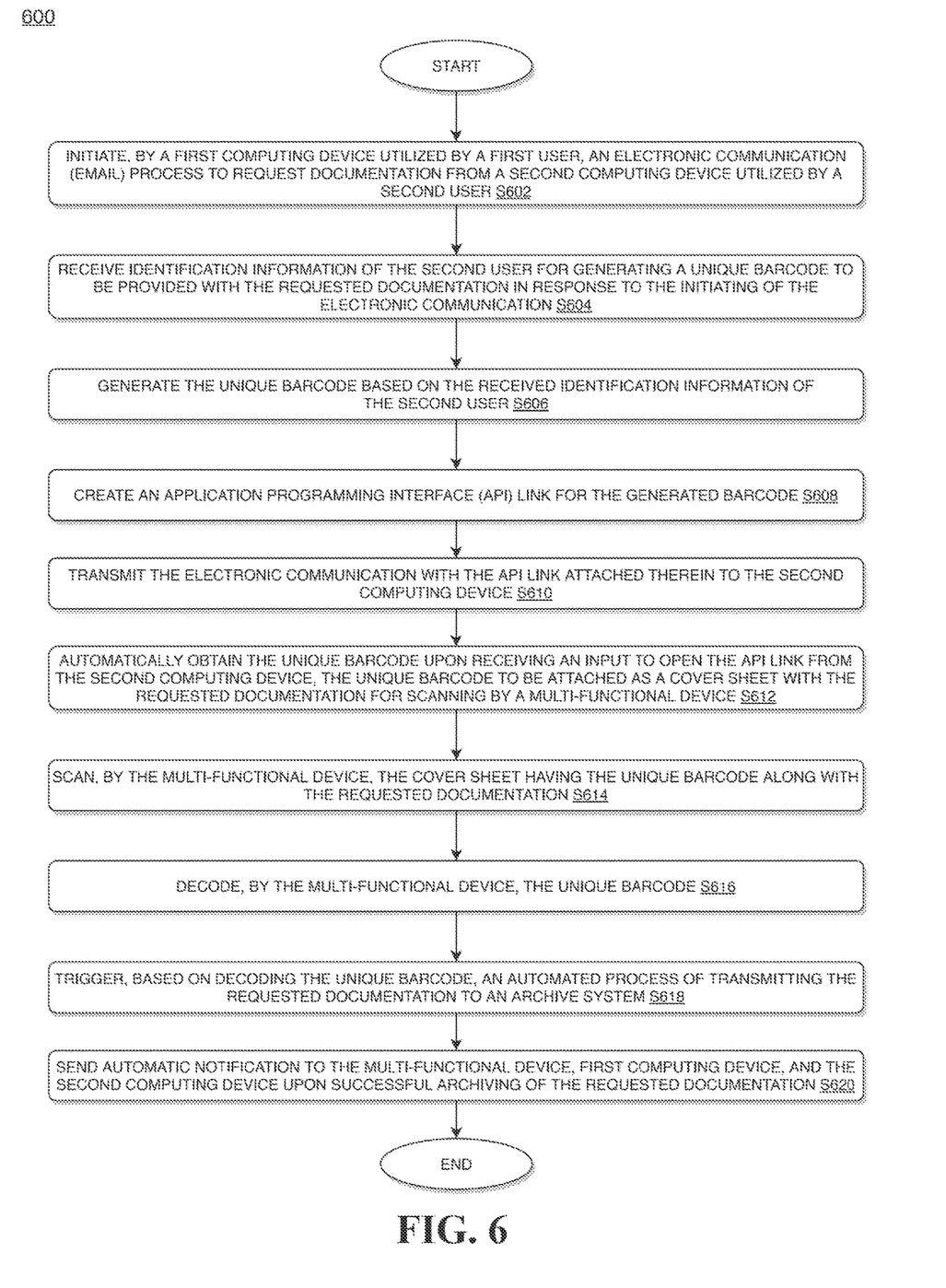
FIG. 6 illustrates a flow chart for implementing a verification documentation receiving module in accordance with an exemplary embodiment.

FIG. 6 illustrates a flow chart for implementing a verification documentation receiving module by utilizing one or more processors and one or more memories in accordance with an exemplary embodiment.

According to exemplary embodiments, at step S602, the process 600 may initiate, by a first computing device utilized by a first user, an electronic communication process to request documentation from a second computing device utilized by a second user.

According to exemplary embodiments, at step S604, the process 600 may receive identification information of the second user for generating a unique barcode to be provided with the requested documentation in response to the initiating of the electronic communication.

According to exemplary embodiments, at step S606, the process 600 may generate the unique barcode based on the received identification information of the second USER.

According to exemplary embodiments, at step S608, the process 600 may create an application programming interface (API) link for the generated barcode.

According to exemplary embodiments, at step S610, the process 600 may transmit the electronic communication with the API link attached therein to the second computing device.

According to exemplary embodiments, at step S612, the process 600 may automatically obtain the unique barcode upon receiving an input to open the API link from the second computing device, the unique barcode to be attached as a cover sheet with the requested documentation for scanning by a multi-functional device. According to exemplary embodiments, at step S612, the process 600 may further include: automatically sending an inquiry, by an e-mail client device associated with an e-mail account of the second user to a barcode management micro service device via an API gateway based on receiving the input to open the API link from the second computing device, to confirm that the API link is sent to the second user who is an authorized user, verifying that the second user is an authorized user who should receive the unique barcode based on matching the identification information of the second user with the associated e-mail account of the second user; and sending the unique barcode to the e-mail account of the second user for further processing.

According to exemplary embodiments, at step S614, the process 600 may scan, by the multi-functional device, the cover sheet having the unique barcode along with the requested documentation.

According to exemplary embodiments, at step S616, the process 600 may decode, by the multi-functional device, the unique barcode.

According to exemplary embodiments, at step S618, the process 600 may trigger, based on decoding the unique barcode, an automated process of transmitting the requested documentation to an archive system.

According to exemplary embodiments, at step S620, the process 600 may send automatic notification to the multi-functional device, the first computing device, and the second computing device upon successful archiving of the requested documentations.

According to exemplary embodiments as disclosed above in FIGS. 1-6, technical improvements effected by the instant disclosure may include platforms for implementing a verification documentation receiving module for automating the process of receiving additional verification documentation from an applicant at retail branches, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automating a process of receiving documentation by utilizing one or more processors and one or more memories, the method comprising:
   initiating, by a first computing device utilized by a first user, an electronic communication process to request documentation from a second computing device utilized by a second user;
   receiving identification information of the second user for generating a unique barcode to be provided with the requested documentation in response to the initiating of the electronic communication process to transmit an electronic communication;
   generating the unique barcode based on the received identification information of the second user;
   creating an application programming interface (API) link for the generated unique barcode;
   transmitting the electronic communication with the API ink attached therein to the second computing device;
   automatically obtaining, by an electronic mail client, the unique barcode upon receiving an input to open the API link from the second computing device, the unique barcode to be attached as a cover sheet with the requested documentation for scanning by a multi-functional device;
   transmitting the cover sheet having the unique barcode along with the requested documentation to the multi-functional device;
   scanning, by the multi-functional device, the cover sheet having the unique barcode along with the requested documentation;
   decoding, by the multi-functional device, the unique barcode;
   triggering, based on decoding the unique barcode, an automated process of transmitting the requested documentation to an archive system;
   sending an automatic electronic acknowledgement notification to a personnel's computing device operatively connected to the multi-functional device; and
   sending an automatic electronic notification to the first computing device and the second computing device that the requested documentation has been successfully archived in the archive system.

2. The method according to claim 1, wherein the unique barcode is a one-time use barcode such that transmitting verification documentation by the multi-functional device with an already used barcode would be rejected by an archive system.

3. The method according to claim 1, wherein the electronic communication process is an electronic mail (e-mail) communication process.

4. The method according to claim 1, wherein the automatic electronic notification includes one or more of the following: e-mail, SMS (Short Message Service), and push notification.

5. The method according to claim 1, wherein the automatically obtaining the unique barcode further comprising:
   automatically sending an inquiry, by an e-mail client device associated with an e-mail account of the second user to a barcode management micro service device via an API gateway based on receiving the input to open the API link from the second computing device, to confirm that the API link is sent to the second user who is an authorized user.

6. The method according to claim 5, further comprising:
   verifying that the second user is an authorized user who should receive the unique barcode based on matching the identification information of the second user with the associated e-mail account of the second user.

7. The method according to claim 6, further comprising:
   sending the unique barcode to the e-mail account of the second user for further processing.

8. A system for automating a process of receiving documentation, comprising:
   a memory and one or more processors operatively connected to the memory via a communication network,
   wherein the one or more processors are configured to:
      initiate, by a first computing device utilized by a first user, an electronic communication process to request documentation from a second computing device utilized by a second user;
      receive identification information of the second user for generating a unique barcode to be provided with the requested documentation in response to the initiating of the electronic communication process to transmit an electronic communication;
      generate the unique barcode based on the received identification information of the second user;
      create an application programming interface (API) link for the generated unique barcode;
      transmit the electronic communication with the API link attached therein to the second computing device;
      automatically obtain, by an electronic mail client, the unique barcode upon receiving an input to open the API link from the second computing device, the unique barcode to be attached as a cover sheet with the requested documentation for scanning by a multi-functional device;
      transmit the cover sheet having the unique barcode along with the requested documentation to the multi-functional device;
      scan, by the multi-functional device, the cover sheet having the unique barcode along with the requested documentation;
      decode, by the multi-functional device, the unique barcode;
      trigger, based on decoding the unique barcode, an automated process of transmitting the requested documentation to an archive system;
      send an automatic electronic acknowledgement notification to a personnel's computing device operatively connected to the multi-functional device; and
      send an automatic electronic notification to the first computing device and the second computing device that the requested documentation has been successfully archived in the archive system.

9. The system according to claim 8, wherein the unique barcode is a one-time use barcode such that transmitting verification documentation by the multi-functional device with an already used barcode would be rejected by an archive system.

10. The system according to claim 8, wherein the electronic communication process is an electronic mail (e-mail) communication process.

11. The system according to claim 8, wherein the automatic electronic notification includes one or more of the following: e-mail, SMS (Short Message Service), and push notification.

12. The system according to claim 8, wherein for automatically obtaining the unique barcode, the one or more processors are further configured to:

automatically send an inquiry, by an e-mail client device associated with an e-mail account of the second user to a barcode management micro service device via an API gateway based on receiving the input to open the API link from the second computing device, to confirm that the API link is sent to the second user who is an authorized user.

13. The system according to claim 12, wherein the one or more processors are further configured to:

verify that the second user is an authorized user who should receive the unique barcode based on matching the identification information of the second user with the associated e-mail account of the second user.

14. The system according to claim 13, wherein the one or more processors are further configured to:

send the unique barcode to the e-mail account of the second user for further processing.

15. A non-transitory computer readable medium configured to store instructions for automating a process of receiving documentation, wherein when executed, the instructions cause one or more processors to perform the following:

initiating, by a first computing device utilized by a first user, an electronic communication process to request documentation from a second computing device utilized by a second user;

receiving identification information of the second user for generating a unique barcode to be provided with the requested documentation in response to the initiating of the electronic communication process to transmit an electronic communication;

generating the unique barcode based on the received identification information of the second user;

creating an application programming interface (API) link for the generated unique barcode;

transmitting the electronic communication with the API link attached therein to the second computing device;

automatically obtaining, by an electronic mail client, the unique barcode upon receiving an input to open the API link from the second computing device, the unique barcode to be attached as a cover sheet with the requested documentation for scanning by a multi-functional device;

transmitting the cover sheet having the unique barcode along with the requested documentation to the multi-functional device;

scanning, by the multi-functional device, the cover sheet having the unique barcode along with the requested documentation;

decoding, by the multi-functional device, the unique barcode;

triggering, based on decoding the unique barcode, an automated process of transmitting the requested documentation to an archive system;

sending an automatic electronic acknowledgement notification to a personnel's computing device operatively connected to the multi-functional device; and sending an automatic electronic notification to the first computing device and the second computing device that the requested documentation has been successfully archived in the archive system.

16. The non-transitory computer readable medium according to claim 15, wherein the unique barcode is a one-time use barcode such that transmitting verification documentation by the multi-functional device with an already used barcode would be rejected by an archive system.

17. The non-transitory computer readable medium according to claim 15, wherein the automatic electronic notification includes one or more of the following: e-mail, SMS (Short Message Service), and push notification.

18. The non-transitory computer readable medium according to claim 15, wherein in automatically obtaining the unique barcode, the instructions, when executed, cause the one or more processors to perform the following:

automatically sending an inquiry, by an e-mail client device associated with an e-mail account of the second user to a barcode management micro service device via an API gateway based on receiving the input to open the API link from the second computing device, to confirm that the API link is sent to the second user who is an authorized user.

19. The non-transitory computer readable medium according to claim 18, wherein the instructions, when executed, cause the one or more processors to perform the following:

verifying that the second user is an authorized user who should receive the unique barcode based on matching the identification information of the second user with the associated e-mail account of the second user.

20. The non-transitory computer readable medium according to claim 19, wherein the instructions, when executed, cause the one or more processors to perform the following:

sending the unique barcode to the e-mail account of the second user liar further processing.

* * * * *